US010111127B2

(12) United States Patent
Cui et al.

(10) Patent No.: US 10,111,127 B2
(45) Date of Patent: Oct. 23, 2018

(54) ENHANCED SOFTWARE-DEFINED NETWORK CONTROLLER TO SUPPORT AD-HOC RADIO ACCESS NETWORKS

(71) Applicant: AT&T Intellectual Property I, L.P., Atlanta, GA (US)

(72) Inventors: Zhi Cui, Sugar Hill, GA (US); Jiansong Wang, Parlin, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 174 days.

(21) Appl. No.: 15/054,180

(22) Filed: Feb. 26, 2016

(65) Prior Publication Data

US 2017/0251393 A1      Aug. 31, 2017

(51) Int. Cl.
*H04W 28/02* (2009.01)
*H04W 84/18* (2009.01)
*H04L 29/12* (2006.01)

(52) U.S. Cl.
CPC ....... *H04W 28/021* (2013.01); *H04L 61/2514* (2013.01); *H04L 61/2015* (2013.01); *H04W 84/18* (2013.01)

(58) Field of Classification Search
CPC .......... H04L 61/2007; H04W 4/005; H04W 28/021; H04W 36/0016; H04W 36/0077; H04W 36/12; H04W 48/17
See application file for complete search history.

(56) References Cited

U.S. PATENT DOCUMENTS

| | | | |
|---|---|---|---|
| 9,100,285 B1 | 8/2015 | Choudhury et al. | |
| 9,107,151 B2 | 8/2015 | Pazhyannur et al. | |
| 9,113,352 B2 | 8/2015 | Agarwal et al. | |
| 2009/0161581 A1* | 6/2009 | Kim | H04L 29/12216 370/254 |
| 2014/0006585 A1* | 1/2014 | Dunbar | H04L 41/00 709/223 |
| 2015/0023210 A1 | 1/2015 | Kis | |

(Continued)

FOREIGN PATENT DOCUMENTS

CN      103248724      8/2013
CN      104301129      1/2015

*Primary Examiner* — Hassan Kizou
*Assistant Examiner* — Roberta A Shand
(74) *Attorney, Agent, or Firm* — Hartman & Citrin LLC

(57) ABSTRACT

Concepts and technologies disclosed herein are directed to an enhanced software-defined networking ("SDN") controller to support ad-hoc radio access technologies ("RATs"). An SDN controller receives, from an ad-hoc radio access controller serving an ad-hoc radio access network ("RAN"), an attach request sent on behalf of a user equipment ("UE") operating in communication with an ad-hoc RAT transceiver node. The attach request includes a physical IP address associated with the UE. The physical IP address includes an IP address sub-interface pre-fix broadcast to the UE by the ad-hoc RAT transceiver node combined with a physical address of the UE. In response to the attach request, the SDN controller can complete an attachment procedure for allowing the ad-hoc radio access controller to an SDN network. The SDN controller also can update one or more components operating within the SDN network to reflect how to reach the UE via the physical IP address.

13 Claims, 8 Drawing Sheets

(56) References Cited

U.S. PATENT DOCUMENTS

| | | | |
|---|---|---|---|
| 2015/0109995 A1* | 4/2015 | Mathai | H04L 61/301 |
| | | | 370/328 |
| 2015/0124625 A1 | 5/2015 | Aldrin et al. | |
| 2015/0208316 A1 | 7/2015 | Mosko et al. | |
| 2015/0270988 A1 | 9/2015 | Finkelstein | |
| 2015/0381493 A1 | 12/2015 | Bansal et al. | |
| 2015/0382278 A1 | 12/2015 | Fallon et al. | |
| 2016/0127230 A1* | 5/2016 | Cui | H04W 40/02 |
| | | | 370/389 |
| 2016/0150448 A1* | 5/2016 | Perras | H04W 36/12 |
| | | | 455/450 |
| 2016/0173338 A1* | 6/2016 | Wolting | H04L 41/145 |
| | | | 709/223 |
| 2016/0234730 A1* | 8/2016 | John | H04W 36/0033 |
| 2016/0337248 A1* | 11/2016 | McCann | H04W 28/02 |

\* cited by examiner

ENHANCED SOFTWARE-DEFINED NETWORK CONTROLLER TO SUPPORT AD-HOC RADIO ACCESS NETWORKS

BACKGROUND

Mobile network traffic has been growing at a very fast pace. In addition, the variation of network end points, the variation of applications, and the variation of mobility states of user equipment devices ("UE") (e.g., whether or not a UE is moving, and if so, how fast) are growing, and this trend will likely continue.

In the current state of the art, different radio technologies, such as WI-FI and cellular, utilize different management and control mechanisms, and the same is true even within Third Generation Partnership Project ("3GPP") cellular technologies. Current cellular network management treats all end points as equal. This management approach works for existing device types, which are primarily smart devices such as smart phones, tablets, and the like.

The Internet of Things ("IoT") is gaining significant momentum in the industry, particularly as machine-to-machine ("M2M") connectivity improves with new mobile communications technologies. The number of M2M/IoT devices is expected to grow from 5 billion in 2015 to over 25 billion by 2020. With the significant growing trend of M2M and IoT to billions of end points (most of which never move), constantly using the existing management and control mechanisms of provisioning and maintaining complex general packet radio service ("GPRS") tunneling protocol ("GTP") tunnels will no longer be the most cost effective method in this new paradigm.

SUMMARY

Concepts and technologies disclosed herein are directed to an enhanced software-defined networking ("SDN") controller to support ad-hoc radio access technologies ("RATs"). According to one aspect of the concepts and technologies disclosed herein, an SDN controller receives, from an ad-hoc radio access controller serving an ad-hoc radio access network ("RAN"), an attach request sent on behalf of a UE operating in communication with an ad-hoc RAT transceiver node. The attach request includes a physical IP address associated with the UE. The physical IP address includes an IP address sub-interface pre-fix broadcast to the UE by the ad-hoc RAT transceiver node combined with a physical address of the UE. In response to the attach request, the SDN controller can complete an attachment procedure for allowing the ad-hoc radio access controller to connect/attach to an SDN network. The SDN controller also can update one or more components operating within the SDN network to reflect how to reach the UE via the physical IP address.

In some embodiments, the SDN controller can inform the ad-hoc radio access controller of attachment success. The SDN controller also can communicate with the ad-hoc radio access controller as if the ad-hoc radio access controller is a base station operating within a public carrier RAN.

In some embodiments, the SDN controller can provide, to the ad-hoc radio access controller, an address of a preferred dynamic host configuration protocol ("DHCP") server. The ad-hoc radio access controller can request a public session layer IP address from the preferred DHCP server.

In some embodiments, the SDN controller can receive, from the ad-hoc radio access controller, an association between the public session layer IP address and the physical IP address. The SDN controller can update the component(s) operating within the SDN network to reflect how to reach the UE via the public session layer IP address through the ad-hoc radio access controller with the IP address sub-interface pre-fix.

In some embodiments, during a handover procedure whereby the UE moves from the ad-hoc RAN to the public carrier RAN, the SDN controller can send the public session layer IP address to the UE so that the UE can communicate with the public carrier RAN without service interruption. In some embodiments, the UE is an IoT device. In other embodiments, the UE is a smartphone or other mobile device.

In some embodiments, the ad-hoc RAN operates in accordance with an ad-hoc RAT. The ad-hoc RAT can include, for example, wireless local area network ("WLAN"), low-power wide-area network ("LPWAN"), long-range wide-area network ("LoRaWAN"), and BLUETOOTH peer-to-peer.

According to another aspect of the concepts and technologies disclosed herein, an ad-hoc radio access controller can receive an attach request from a UE operating in communication with an ad-hoc radio access technology transceiver node served by the ad-hoc radio access controller. The attach request can include a physical IP address associated with the UE. The physical IP address comprises an IP address sub-interface pre-fix broadcast to the user equipment by the ad-hoc radio access technology transceiver node combined with a physical address of the UE. In response to the attach request, the ad-hoc radio access controller can complete an attachment procedure for allowing the UE to access an ad-hoc RAN. The ad-hoc RAN can include one or more ad-hoc radio access technology transceiver nodes. The ad-hoc radio access controller can provide, on behalf of the UE, the attach request to an SDN controller. The SDN controller completes the attachment process for allowing the UE access to an SDN network via the ad-hoc RAN.

In some embodiments, the ad-hoc radio access controller can receive, from the SDN controller, notification of attachment success. The ad-hoc radio access controller can receive, from the SDN controller, an address of a preferred DHCP server. The ad-hoc radio access controller can request, from the SDN controller, a public session layer IP address from the preferred DHCP server. The ad-hoc radio access controller can receive, from the preferred DHCP server, the public session layer IP address.

In some embodiments, the ad-hoc radio access controller can assign a local private IP address to the UE. The ad-hoc radio access controller can inform the SDN controller of an association between the public session layer IP address and the physical IP address. The ad-hoc radio access controller can set up network address translation ("NAT") and port address translation ("PAT") between the local private IP address and the public session layer IP address.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The concepts and technologies disclosed herein are directed to an enhanced SDN controller to support ad-hoc radio access technologies ("RATs") through a connectionless-based native Internet protocol by defining a plug-in interface. Some examples of ad-hoc RATs that the concepts and technologies disclosed herein can support include, but are not limited to, wireless local area network ("WLAN"), low-power wide-area network ("LPWAN"), long-range WAN ("LoRaWAN"), and BLUETOOTH peer-to-peer. According to one aspect of the concepts and technologies disclosed herein, the radio access controllers and gateways of ad-hoc RANs can appear as a 5G base transceiver station ("BTS") or node-b to an SDN controller.

Intra-RAT mobility management within ad-hoc RANs is not overseen by the enhanced SDN controller. Instead, intra-RAT mobility management can be handled autonomously by native radio access controllers for the RATs involved. Native radio access controllers also can manage radio resource allocation and load-balancing within supported ad-hoc RANs. Additionally, the native radio access controllers can report resource load status to the enhanced SDN controller. The enhanced SDN controller can manage the mobility between ad-hoc RATs and 3GPP-adapted 5G RATs used by public wireless carriers. The enhanced SDN controller can manage session continuity for devices accessing through the ad-hoc RANs.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Figure 1:
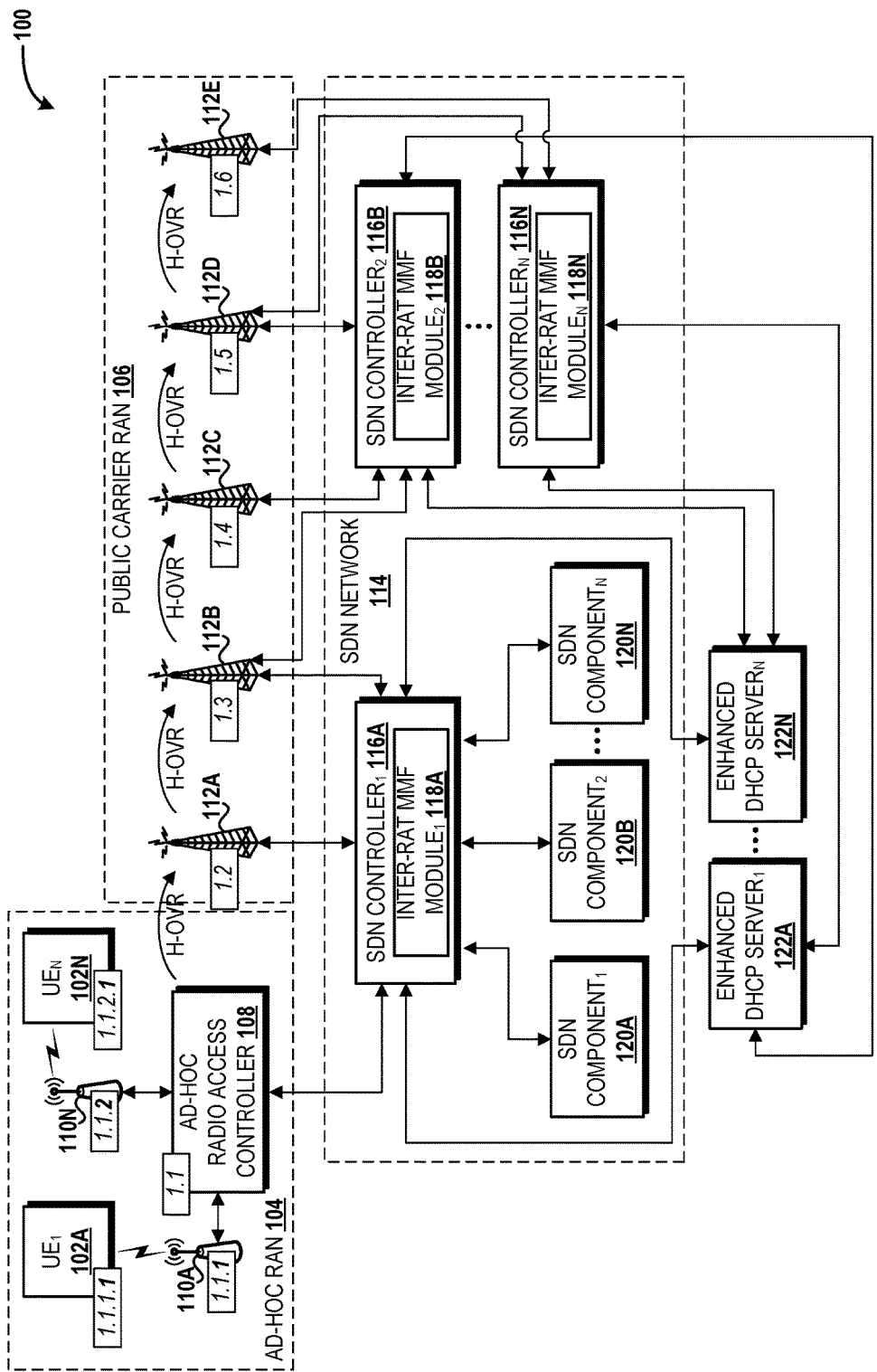
FIG. 1 is a block diagram illustrating an operating environment in which aspects of the concepts and technologies disclosed herein can be implemented.

Turning now to FIG. 1, a block diagram illustrating an operating environment 100 in which aspects of the concepts and technologies disclosed herein can be implemented. The operating environment 100 includes a plurality of user equipment devices ("UEs") 102A-102N (referred to herein collectively as UEs 102, or in the singular form as UE 102) currently operating in communication with an ad-hoc radio access network ("RAN") 104 and capable of communication with a public wireless telecommunications network carrier RAN ("public carrier RAN") 106.

Each of the UEs 102 can be a cellular phone, a feature phone, a smartphone, a mobile computing device, a tablet computing device, a portable television, a portable video game console, or the like capable of communicating with the ad-hoc RAN 104 and the public carrier RAN 106. In some embodiments, one or more of the UEs 102 is an IoT device. As an IoT device, the UE 102 can be or can include any "thing" that is configured to be network addressable so as to connect to and communicate with one or more networks, such as the ad-hoc RAN 104 and the public carrier RAN 106, over which to communicate with other connected devices, including, for example, computers, smartphones, tablets, vehicles, other IoT/M2M devices, servers, other networks, the Internet, combinations thereof, and the like. Moreover, the UE 102 embodied as an IoT device can be deployed for consumer use, business use, and can find application in many industry-specific use cases. For example, the UE 102 embodied as an IoT device may find at least partial application in the following industries: automotive; energy; healthcare; industrial; retail; and smart buildings/homes. Those skilled in the art will appreciate the applicability of IoT-solutions to other industries as well as consumer and business use cases. For this reason, applications of the UE 102 embodied as an IoT device described herein are used merely to illustrate some example applications of IoT devices, and therefore should not be construed as being limiting in any way. It should be understood that the UE 102 can be a mobile device, such as a smartphone, or a stationary device, such as an IoT power meter or like device.

The ad-hoc RAN 104 can operate in accordance with one or more ad-hoc RATs, some examples of ad-hoc RATs include, but are not limited to, WLAN, LPWAN, LoRaWAN, and BLUETOOTH peer-to-peer. It should be understood that any RAT that is ad-hoc or provides an ad-hoc mode of operation are contemplated. As such, the example ad-hoc RATs provided herein should not be construed as being limiting in any way.

The illustrated ad-hoc RAN 104 includes an ad-hoc radio access controller 108 that controls one or more ad-hoc RAT transceiver nodes 110A-110N (referred to herein collectively as ad-hoc RAT transceiver nodes 110, or in the singular form as ad-hoc RAT transceiver node 110), essentially functioning as radio network controller as understood by those skilled in the art. The ad-hoc RAT transceiver nodes 110 provide a radio-air interface over which the UEs 102 can connect to the ad-hoc RAN 104. The particular architecture of the ad-hoc RAT transceiver nodes 110 can be designated by the standards of the RAT utilized thereby. As such, additional details in this regard are not provided herein. Moreover, the ad-hoc RAT transceiver nodes 110 can include or can be in communication with one or more antennas (not shown), each of which may be configured in accordance with any antenna design specifications to provide a physical interface for receiving and transmitting radio waves to and from one or more devices, such as the UEs 102 in accordance with an ad-hoc RAT standard specification.

Communications with the ad-hoc RAN 104 can be handed over (as shown in FIG. 1 as handover/H-OVR operations) to the public carrier RAN 106 when the UE 102 travels outside of a coverage area provided by the ad-hoc RAN 104 and vice versa. The public carrier RAN 106 can include one or more service areas ("cells") having the same or different cell sizes. The public carrier RAN 106 can operate in accordance with one or more RATs that utilize mobile telecommunications standards including, but not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other current 3GPP cellular technologies, other future 3GPP cellular technologies, combinations thereof, and/or the like.

The public carrier RAN 106 can utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like to provide a radio/air interface to the UEs 102. Data communications can be provided in part by the public carrier RAN 106 using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, the public carrier RAN 106 may be a GSM RAN ("GRAN"), a GSM EDGE RAN ("GERAN"), a UMTS Terrestrial Radio Access Network ("UTRAN"), an evolved U-TRAN ("E-UTRAN"), any combination thereof, and/or the like. The concepts and technologies disclosed herein will, at times, be described in context of the public carrier RAN 106 operating in accordance with LTE, although those skilled in the art will appreciate the applicability of the concepts and technologies disclosed herein to other cellular technologies, including, in particular, those captured within future generation 3GPP standards. Moreover, in some embodiments, the public carrier RAN 106 is or includes one or more virtual RANs ("vRANs").

The UEs 102 can communicate with the public carrier RAN 106 by way of one or more base stations 112A-112E. As used herein, a "base station" refers to a radio receiver and/or transmitter (collectively, transceiver) that is/are configured to provide a radio/air interface over which one or more of the UEs 102 can connect to a network, such as the public carrier RAN 106. Accordingly, a base station is intended to encompass one or more base transceiver stations ("BTSs"), one or more node-Bs, one or more e-node-Bs, and/or other networking nodes or combinations thereof that are capable of providing a radio/air interface for the public carrier RAN 106 regardless of the technologies utilized to do so. A base station can be in communication with one or more antennas (not shown), each of which may be configured in accordance with any antenna design specifications to provide a physical interface for receiving and transmitting radio waves to and from one or more devices, such as the UEs 102. Although only five base stations are shown, the public carrier RAN 106 can support any number of base stations, including base stations that operate in accordance with multiple RATs.

The ad-hoc RAN 104 and the public carrier RAN 106 are shown as being in communication with an SDN network 114. The SDN network 114 is a network implemented in accordance with SDN concepts. SDN is an architectural framework for creating intelligent networks that are programmable, application aware, and more open. SDN provides an agile and cost-effective communications platform for handling the dramatic increase in data traffic on carrier networks by providing a high degree of scalability, security, and flexibility. SDN provides several benefits. SDNs can allow for the creation of multiple, virtual network control planes on common hardware. SDN can help extend service virtualization and software control into many existing network elements. SDN enables applications to request and manipulate services provided by the network and allow the network to expose network states back to the applications. SDN exposes network capabilities through application programming interfaces ("APIs"), making the control of network equipment remotely accessible and modifiable via third-party software clients, using open protocols such as OpenFlow, available from Open Network Forum ("ONF"). 3GPP and other standards bodies and industry forums are currently working to standardize SDN for use in multiple aspects of future mobile telecommunications networks under 5G standards.

The illustrated SDN network 114 includes a plurality of SDN controllers 116A-116N (referred to herein collectively as SDN controllers 116, or in the singular form as SDN controller 116). The SDN controller 116 can, on-demand, allocate wireless spectrum resources to the base stations 112 operating in the public carrier RAN 106. The SDN controllers 116 can utilize OpenFlow protocols to control operations performed by the plurality of base stations 112 operating within the ad-hoc RAN 104.

In accordance with the concepts and technologies disclosed herein, each of the SDN controllers 116A-116N has been configured with an inter-RAT mobility management function ("MMF") module 118A-118N, respectively (referred to herein collectively as inter-RAT MMF modules 118, or in the singular form as inter-RAT MMF module 118). The inter-RAT MMF module 118 enhances the functionality of the SDN controllers 116 to support any ad-hoc access networks, such as the ad-hoc RAN 104, through a connectionless-based native IP protocol interface by defining a plug-in interface. The inter-RAT MMF modules 118 also allow the SDN controllers 116 to manage mobility (e.g., H-OVR) between the ad-hoc RAN 104 and the public carrier RAN 106. The SDN controllers 116 also manage session continuity for the UEs 102 accessing through the ad-hoc RAN 104 and extend dynamic host configuration protocol ("DHCP") procedures into the ad-hoc radio access controller 108.

The ad-hoc radio access controller 108 appears to the SDN controller 116 as a 5G base station (BTS/node-B). Similarly, other radio controllers and/or gateways (not shown) of other ad-hoc RANs (also not shown) appear to the SDN controller 116 as different 5G base stations. The SDN controllers 116 do not oversee intra-RAT mobility management such as within the ad-hoc RAN 104. Instead, the ad-hoc radio access controller 108 (i.e., the "native" radio controller) performs mobility management for the UEs 102 when operating within the ad-hoc RAN 104. The ad-hoc radio access controller 108 also manages radio resource allocation to the ad-hoc RAT transceiver nodes 110 and load-balancing within the ad-hoc RAN 104.

In some embodiments, the ad-hoc radio access controller 108 can report high-level resource utilization information to the SDN controller 116A. The SDN controller 116A can utilize this information for inter-RAT load-balancing among the ad-hoc RAN 104 and the public carrier RAN 106. The SDN controller 116A also can utilize this information for per service level intelligent RAT selection based upon network condition of each RAT, UE subscription, UE mobility, and operator policy.

In the illustrated SDN network 114, the SDN controller 116A is in communication with a plurality of SDN components 120A-120N (referred to herein collectively as SDN components 120, or in the singular form as SDN component 120). Although only the SDN controller 116A is shown as being in communication with the SDN components 120, the other SDN controllers 116B-116N also can be in communication with one or more of the SDN components 120 or others (not shown). As such, the illustrated embodiment should not be construed as being limiting in any way.

The SDN components 120 can include one or more routers, one or more switches, one or more gateways, or some combination thereof. In some embodiments, the SDN components 120 utilize OpenFlow protocols. In some embodiments, the SDN components 120 provide an evolved packet core ("EPC") network. An EPC network provides core network functions in accordance with 3GPP standards specifications. Accordingly, an EPC network can include one or more mobility management entity ("MMEs"), one or more serving gateways ("SGWs"), one or more packet data network gateways ("PGWs"), one or more combination SGW/PGWs, one or more home subscriber servers ("HSSs"), one or more policy and charging rules functions ("PCRFs"), one or more DIAMETER routing agents ("DRAs"), one or more DIAMETER edge agents ("DEAs"), or any combination thereof.

An MME can be configured in accordance with 3GPP standards specifications. An MME, in general, can perform operations to control signaling traffic related to mobility and security for access to the public carrier RAN 106 and the ad-hoc radio access controller 108.

An SGW can be configured in accordance with 3GPP standards specifications. An SGW provides a point of interconnect between the radio-side (e.g., the public carrier RAN 106) and an EPC network. An SGW serves the UEs 102 by routing incoming and outgoing IP packets. A PGW can be configured in accordance with 3GPP standards specifications. A PGW interconnects an EPC network and one or more external IP networks, such as, for example, one or more other networks, including other public land mobile networks ("PLMNs"), PDNs, circuit-switched networks, and the like.

A PGW routes IP packets to and from other network(s). A PGW also performs operations such as IP address/IP prefix allocation, policy control, and charging. In some implementations, a PGW and an SGW are deployed as independent network components, and in other implementations as a combined network component offering functionality of both a PGW and an SGW.

An HSS can be configured in accordance with 3GPP standards specifications. An HSS is a database that contains user-related information for users of devices, such as the UEs 102. An HSS can provide support functions to one or more MMEs for mobility management, call and session setup, user authentication, and access authorization.

A PCRF can be configured in accordance with 3GPP standards specifications. A PCRF can determine policy rules, detect service data flows, enforce policies, and perform flow-based charging.

A DRA can be configured in accordance with 3GPP standards specifications. A DRA is a functional element in a 3G or 4G (e.g., LTE) network that provides real-time routing capabilities to ensure that messages are routed among the correct elements within a network. DRAs were introduced by the 3GPP to address the increased DIAMETER signaling traffic and growing complexity of 4G LTE networks. A DRA can provide real-time routing capabilities to ensure that DIAMETER signaling messages are routed to the correct resources in an EPC network.

A DEA can be configured in accordance with 3GPP standards specifications. A DEA provides a point of contact into and out of an EPC core network at the DIAMETER application level. A DEA provides secure communications to connect an EPC network to the other network(s) to facilitate internetwork signaling operations (e.g., roaming, charging, and billing), for example, between home and visited PLMN. A DEA can enable DIAMETER signaling traffic to flow core networks while also disguising the topology of the core networks to one another.

The SDN controllers 116 also are in communication with a plurality of enhanced DHCP servers 122A-122N (referred to herein collectively as DHCP servers 122, or in the singular form as enhanced DHCP server 122). DHCP protocol is well-known and as such additional details regarding DHCP architecture and procedures are not described in further detail herein. The enhanced DHCP servers 122 distribute and update IP addresses and other configuration information for the SDN network 114 for distribution to the ad-hoc RAN 104 via the SDN controller 116 and ad-hoc radio access controller 108. Additional details in this regard are described herein below with reference to FIGS. 2A-2B.

Figure 2A:
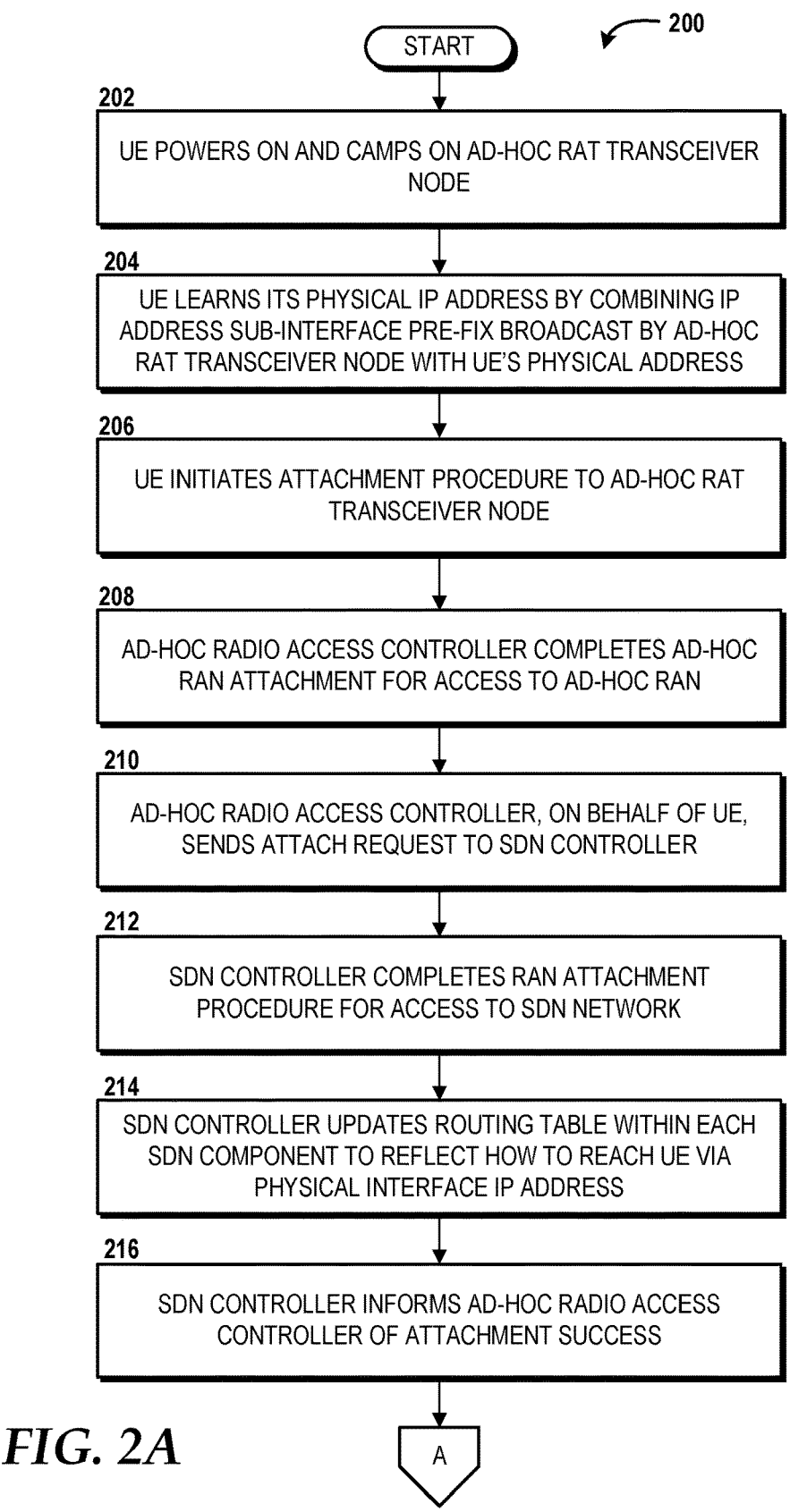
FIGS. 2A-2B are flow diagrams illustrating a method for leveraging an enhanced software-defined network ("SDN") controller for ad-hoc radio access network ("RAN") access management and control, according to an illustrative embodiment.
Figure 2B:
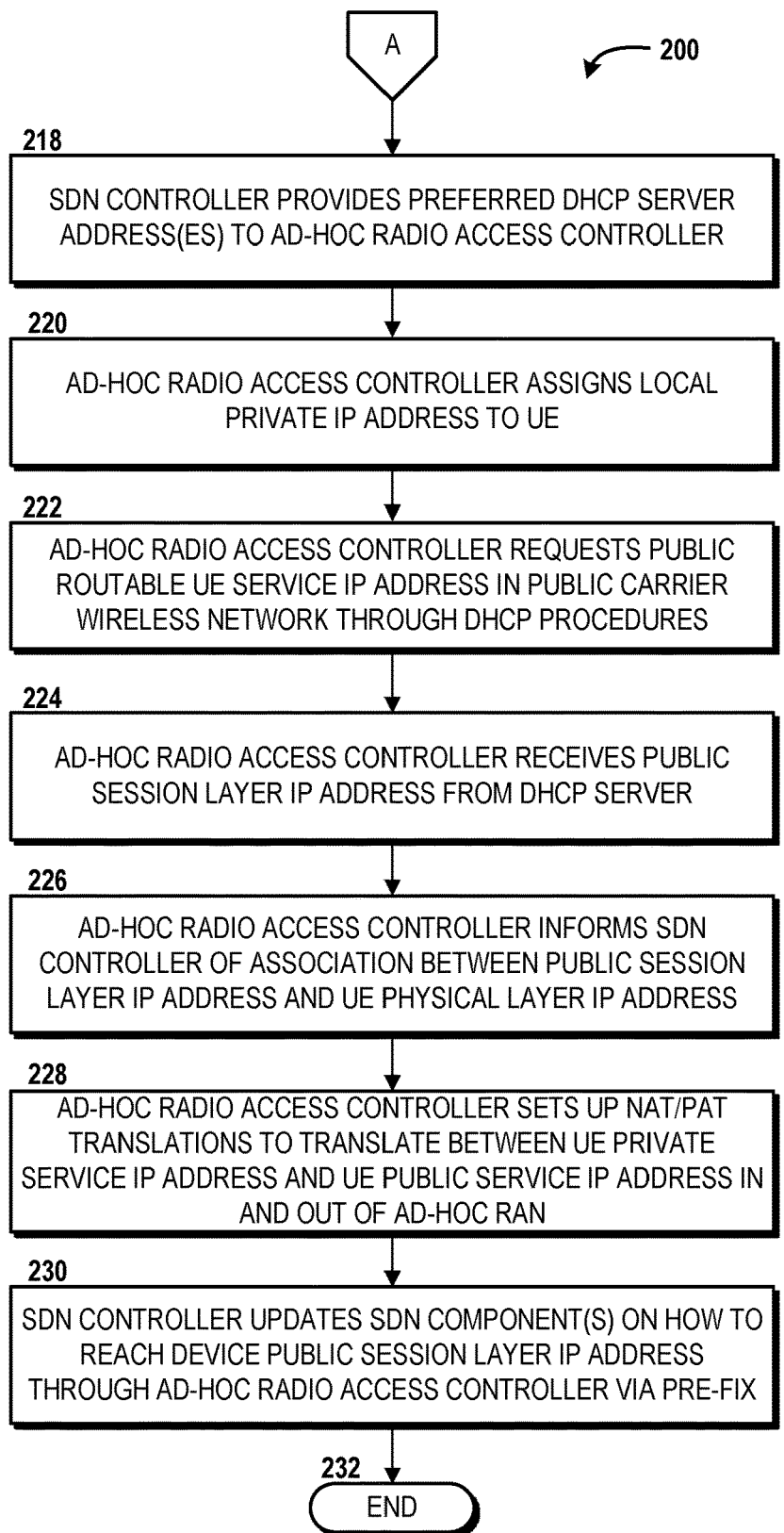

Turning now to FIGS. 2A-2B, aspects of a method 200 for leveraging an enhanced SDN controller, such as the SDN controller 116A, for ad-hoc RAN access management and control will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the illustrated methods can be ended at any time and need not be performed in their entirety. Some or all operations of the methods, and/or substantially equivalent operations, can be performed by execution of computer-executable instructions included on a computer-readable storage media, as defined below. The term "computer-executable instructions," and variants thereof, as used in the description and claims, is used expansively herein to include routines, application programs, software, application modules, program modules, components, data structures, algorithms, and the like. Computer-executable instructions can be implemented on various system configurations, including single-processor or multi-processor systems, distributed computing systems, mini-computers, mainframe computers, personal computers, hand-held computing devices, microprocessor-based, programmable consumer electronics, network nodes, combinations thereof, and the like.

Thus, it should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 200 will be described with reference to FIGS. 2A-2B and further reference to FIG. 1. Moreover, the operations of the method 200 will be described as being performed by one of the UEs 102, the ad-hoc radio access controller 108, and one of the SDN controllers 116, particularly, the SDN controller 116A. These operations can be performed via execution, by one or more processors, of one or more software program modules or applications.

The method 200 will be described in the following context, using FIG. 1 for reference. The method 200 is described under the assumption that the ad-hoc RAN 104 is embodied as a LPWAN serving a neighborhood. The ad-hoc radio access controller 108 (embodied as an LPWAN radio access controller) is in communication with the SDN controller 116A. The ad-hoc radio access controller 108 acts as a cell, similar to the way in which the base stations 112A-112E operating in the public carrier RAN 106 each serve a corresponding cell.

The ad-hoc radio access controller 108 is associated with an IP address interface pre-fix of 1.1. It should be noted that, in FIG. 1, the IP address interface pre-fixes associated with the components of the ad-hoc RAN 104 and the public carrier RAN 106 are shown in rectangles next to the corresponding component. In the illustrated example, as described above with reference to FIG. 1, the ad-hoc radio access controller 108 is associated with the ad-hoc RAT transceiver nodes 110. Each of the ad-hoc RAT transceiver nodes 110 has its own IP address sub-interface pre-fix— particularly, the ad-hoc RAT transceiver node 110A is associated with an IP address sub-interface pre-fix 1.1.1, and the ad-hoc RAT transceiver node 110N is associated with an IP address sub-interface pre-fix 1.1.2. Each of the UEs 102, based upon attachment to the ad-hoc RAT transceiver nodes 110, formulates its IP address based upon the observed sub-interface pre-fix—that is, the UE 102A is associated with the IP address 1.1.1.1 and the UE 102N is associated with the IP address 1.1.2.1.

The method 200 begins and proceeds to operation 202, where a UE, such as the UE 102A, powers on and camps on an ad-hoc RAT transceiver node, such as the ad-hoc RAT transceiver node 110A in the example shown in FIG. 1. From operation 202, the method 200 proceeds to operation 204, where the UE 102A learns its physical IP address by combining the IP address sub-interface pre-fix broadcast by the ad-hoc RAT transceiver node 110A (i.e., 1.1.1 in the illustrated example) with the UE's 102A physical address.

From operation 204, the method 200 proceeds to operation 206, where the UE 102A initiates an attachment procedure to the ad-hoc RAT transceiver node 110A. From operation 206, the method 200 proceeds to operation 208, where the ad-hoc radio access controller 108 completes ad-hoc RAN attachment procedure for access to the ad-hoc RAN. The attachment procedure can be performed in accordance with standard attachment procedures for the RAT utilized by the ad-hoc RAN 104.

From operation 208, the method 200 proceeds to operation 210, where the ad-hoc radio access controller 108, on behalf of the UE 102A, sends the attach request to the SDN controller 116A. From operation 210, the method 200 proceeds to operation 212, where the SDN controller 116A completes RAN attachment procedure for access to the public carrier RAN 106.

From operation 212, the method 200 proceeds to operation 214, where the SDN controller 116A updates a routing table within each of the SDN components 120 operating within the SDN network 114 to reflect how the SDN components 120 are to reach the UE 102A via the physical interface IP address (operation 204). From operation 214, the method 200 proceeds to operation 216, where the SDN controller 116A informs the ad-hoc radio access controller 108 of the attachment success. At this point, the SDN controller 116A considers the ad-hoc radio access controller 108 as just another base station, such as one of the base stations 112A-112E operating in the public carrier RAN 106.

From operation 216, the method 200 proceeds to operation 218, which is shown in FIG. 2B. At operation 218, the SDN controller 116A provides one or more preferred DHCP server addresses associated with one or more of the enhanced DHCP servers 122 to the ad-hoc radio access controller 108. It should be noted that the SDN controller 116A and SDN components 120 in the SDN network 114 only need to know how to route user packets towards the ad-hoc radio controller 108 with IP address interface pre-fix 1.1.x.x (shown as 1.1 in FIG. 1). How to route the user packets through the sub-interfaces of the ad-hoc transceiver nodes 110 is the responsibility of the ad-hoc radio access controller 108.

From operation 218, the method 200 proceeds to operation 220, where the ad-hoc radio access controller 108 assigns a local private IP address to the UE 102A. In the meantime, the ad-hoc radio access controller 108 acts as a UE proxy for the UE 102A and requests, at operation 222, a session layer IP address in the public carrier wireless network through DHCP procedures. The DHCP request directed to the preferred DHCP server address received from the SDN controller 116A at operation 218 uses the UE physical interface IP address 1.1.1.1 (as shown in the illustrated example). The session layer IP address, in some embodiments, is a public IPv6 address that is directly routable within the public Internet without a private-public address translation. In other words, the ad-hoc radio access controller 108 may assign a local private service IP address to the UE 102A, or a routable public IP address (e.g., IPv6 address). In the case of the private address assigned by the ad-hoc radio access controller 108 to the UE 102A, the ad-hoc radio access controller 108 can act as a UE proxy for the UE 102A and can request a public routable UE session IP address in the public carrier wireless network through the DHCP procedures.

From operation 224, the method 200 proceeds to operation 226, where the ad-hoc radio access controller 108, in response to receiving a response from the enhanced DHCP server 122, informs the SDN controller 116A of the association between the public session layer IP address (received at operation 224) and the UE physical layer IP address. From operation 226, the method 200 proceeds to operation 228, where the ad-hoc radio access controller 108 sets up network address translations ("NATs") and port address translation(s) ("PATs") to translate between the UE private service IP address and the UE public service IP address in and out of the ad-hoc RAN 104. From operation 228, the method 200 proceeds to operation 230, where the SDN controller 116A updates the SDN component(s) 120 on how to reach device public session layer IP address through the ad-hoc radio access controller 108 via the IP address interface pre-fix thereof. From operation 230, the method 200 proceeds to operation 232, where the method 200 ends.

Figure 3:
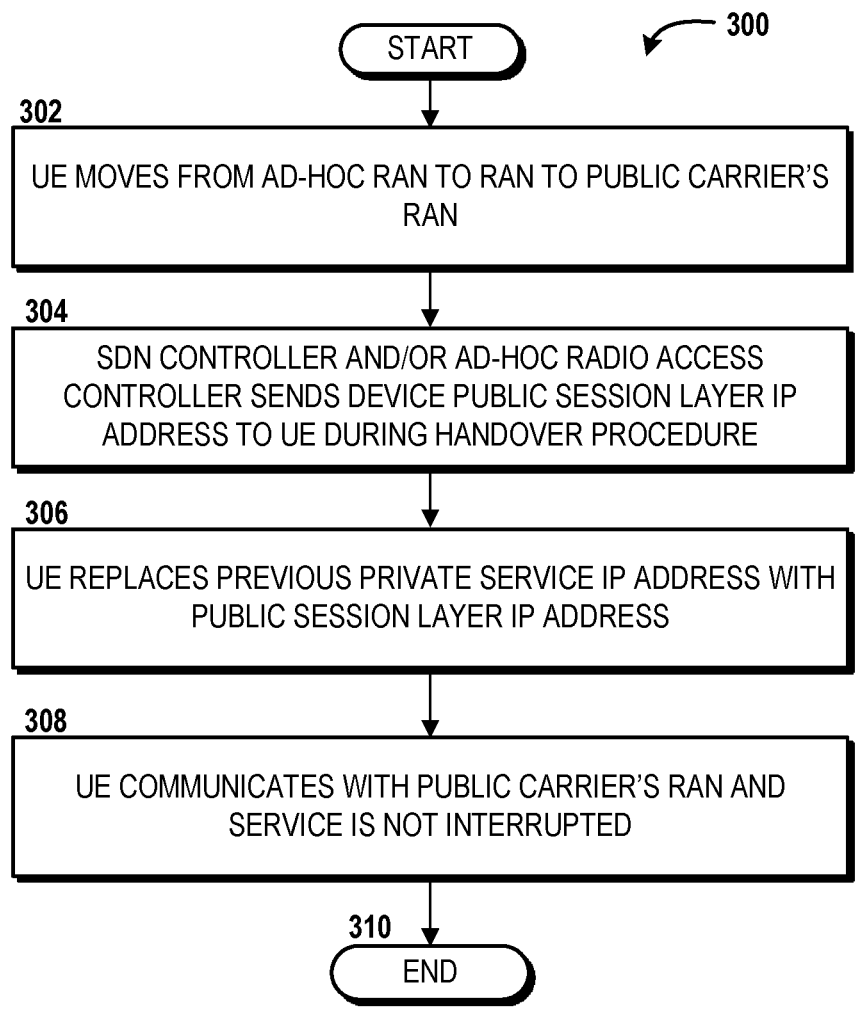
FIG. 3 is a flow diagram illustrating a method for handover between ad-hoc radio access network ("RAN") and public carrier RAN, according to an illustrative embodiment.

Turning now to FIG. 3, a flow diagram illustrating a method 300 for handover between the ad-hoc RAN 104 and the public carrier RAN 106 will be described, according to an illustrative embodiment. The method 300 will be described with reference to FIG. 3 and further reference to FIG. 1.

The method 300 begins and proceeds to operation 302, where the UE 102A moves from the ad-hoc RAN 104 to the public carrier RAN 106 (via the H-OVR shown in the example of FIG. 1). From operation 302, the method 300 proceeds to operation 304, where the SDN controller 116A and/or the ad-hoc radio access controller 108 sends the device public session layer IP address to the UE 102A during the handover procedure.

From operation 304, the method 300 proceeds to operation 306, where the UE 102A replaces the previous private service IP address with the public session layer IP address received at operation 304. From operation 306, the method 300 proceeds to operation 308, where the UE 102A attaches to the base station 112A and communicates with the public carrier RAN 106 without service interruption. Additional handover procedures performed between the cells of the public carrier RAN 106 (e.g., handover from the base station 112A to the base station 112B) are handled per the handover procedure of the RAT utilized by the public carrier RAN 106.

From operation 308, the method 300 proceeds to operation 310. The method 300 ends at operation 310.

Figure 4:
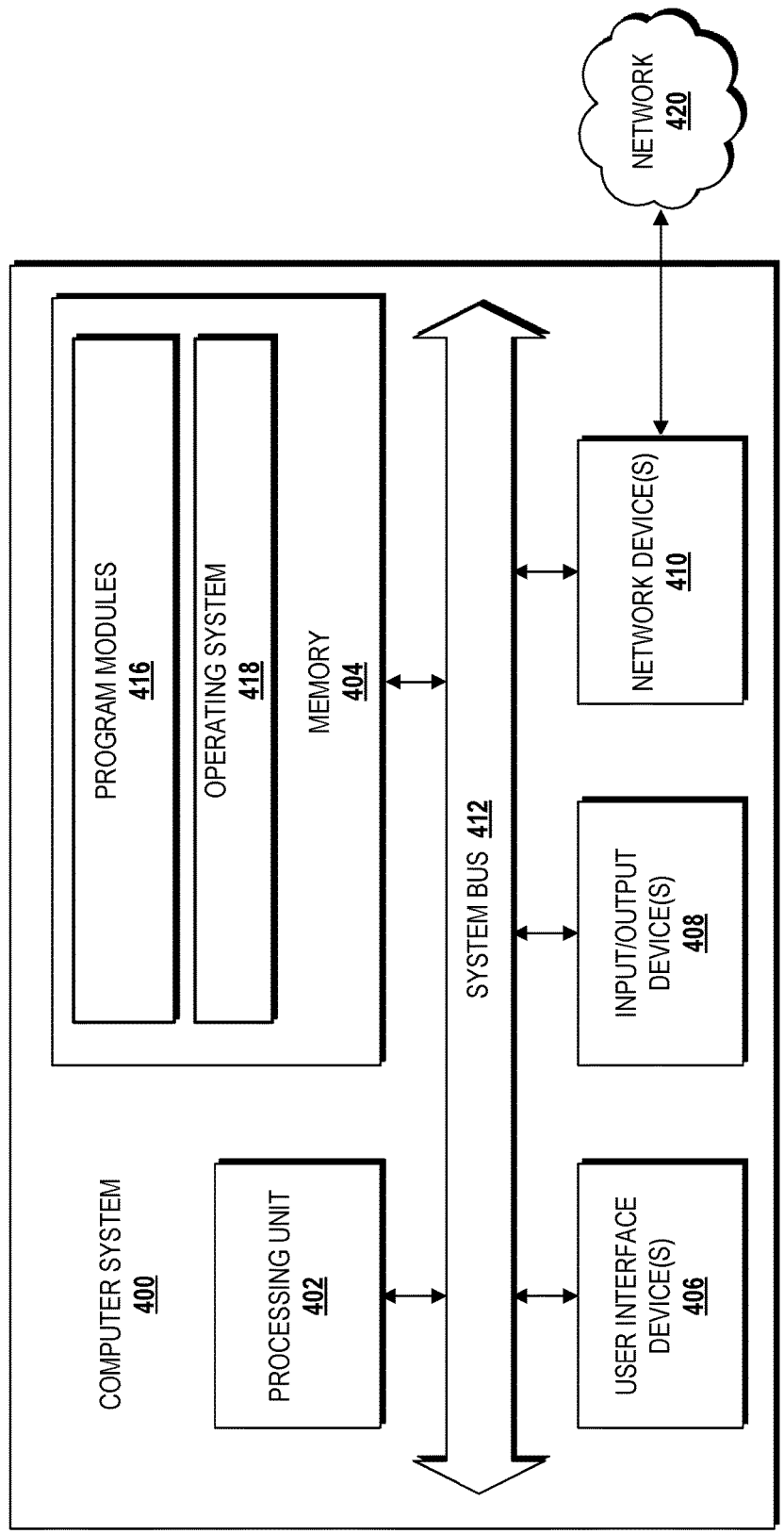
FIG. 4 is a block diagram illustrating an example computer system capable of implementing aspects of the embodiments presented herein.

Turning now to FIG. 4, a block diagram illustrating a computer system 400 configured to provide the functionality in accordance with various embodiments of the concepts and technologies disclosed herein. The systems, devices, and other components disclosed herein, such as, for example, the ad-hoc radio access controller 108, the ad-hoc RAT transceiver nodes 110, the UEs 102, the base stations 112, the SDN controller 116, the SDN components 120, the enhanced DHCP servers 122, or any combination thereof, can utilize or can execute upon, at least in part, an architecture that is the same as or at least similar to the architecture of the computer system 400. It should be understood, however, that modification to the architecture may be made to facilitate certain interactions among elements described herein.

The computer system 400 includes a processing unit 402, a memory 404, one or more user interface devices 406, one or more input/output ("I/O") devices 408, and one or more network devices 410, each of which is operatively connected to a system bus 412. The bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The illustrated memory 404 includes an operating system 418 and one or more program modules 416. The operating system 418 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 416 may include various software and/or program modules to perform the various operations described herein. The program modules 416 and/or other programs can be embodied in computer-readable media containing instructions that, when executed by the processing unit 402, perform various operations such as those described herein. According to embodiments, the program modules 416 may be embodied in hardware, software, firmware, or any combination thereof.

By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium" and variations thereof does not include waves or signals per se and/or communication media.

The user interface devices 406 may include one or more devices with which a user accesses the computer system 400. The user interface devices 406 may include, but are not limited to, computers, servers, PDAs, cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer. In some embodiments, the I/O devices 408 can be used for manual controls for operations to exercise under certain emergency situations.

The network devices 410 enable the computer system 400 to communicate with other networks or remote systems via a network 420. Examples of the network devices 410 include, but are not limited to, a modem, a radio frequency ("RF") or infrared ("IR") transceiver, a telephonic interface, a bridge, a router, or a network card. The network 420 may be or may include a wireless network such as, but not limited to, a WLAN, a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 420 may be or may include a wired network such as, but not limited to, a Wide Area Network ("WAN"), a wired Personal Area Network ("PAN"), or a wired Metropolitan Area Network ("MAN"). The network 420 can be or can include any of the networks described herein, such as the ad-hoc RAN 104, the public carrier RAN 106, and/or the SDN network 114.

Figure 5:
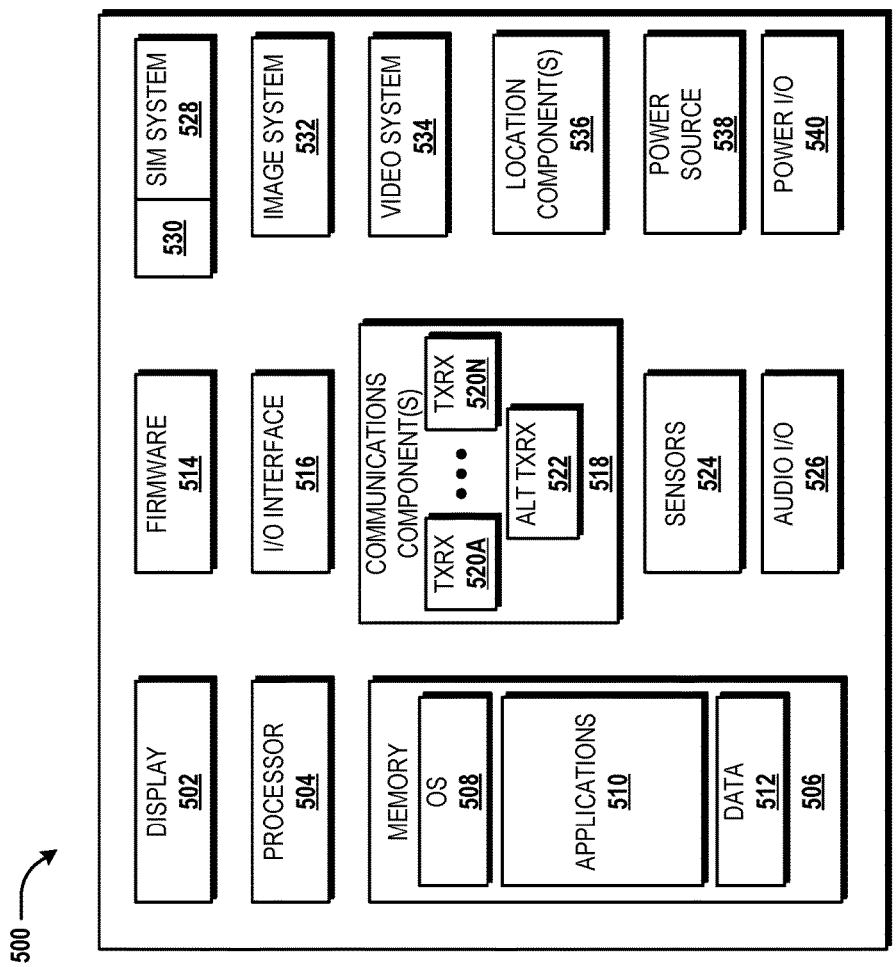
FIG. 5 is a block diagram illustrating an example mobile device capable of implementing aspects of the embodiments disclosed herein.

Turning now to FIG. 5, a block diagram illustrating an example mobile device 500, according to an illustrative embodiment. In some embodiments, one or more of the UEs 102 (shown in FIG. 1) can be configured like the mobile device 500. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. According to various embodiments, the display 502 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in a memory 506, or the like. In some embodiments, the applications 510 also can include a user interface ("UI") application (not illustrated in FIG. 5).

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in entering content, viewing account information, answering/initiating calls, entering/deleting data, entering and setting user IDs and passwords for device access, configuring settings, manipulating address book content and/or settings, multimode interaction, interacting with other applications 510, and otherwise facilitating user interaction with the operating system 508, the applications 510, and/or other types or instances of data 512 that can be stored at the mobile device 500. The data 512 can include, for example, one or more identifiers, and/or other applications or program modules. According to various embodiments, the data 512 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, user information, organization information, presence status information, user IDs, passwords, and application initiation (start-up) requests. In some embodiments, the I/O interface 516 can include a hardwire connection such as USB port, a mini-USB port, a micro-USB port, an audio jack, a PS2 port, an IEEE 1394 "FIREWIRE") port, a serial port, a parallel port, an Ethernet (RJ45) port, an RHO port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using GSM, CDMA ONE, CDMA2000, LTE, and various other 2G, 2.5G, 3G, 4G, 5G, and greater generation technology standards, such as those described herein above as the RATs and the ad-hoc RATs. Moreover, the communications component 518 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 518 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, orientation sensors, noise sensors, proximity sensors, or the like. As such, it should be understood that the sensors 524 can include, but are not limited to, accelerometers, magnetometers, gyroscopes, infrared sensors, noise sensors, microphones, combinations thereof, or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to an MMS message, email message, and sent to another mobile device. The video and/or photo content also can be shared with other devices via various types of data transfers via wired and/or wireless communication devices as described herein.

The mobile device 500 also can include one or more location components 536. The location components 536 can be configured to send and/or receive signals to determine a geographic location of the mobile device 500. According to various embodiments, the location components 536 can send and/or receive signals from global positioning system ("GPS") devices, assisted GPS ("A-GPS") devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

Figure 6:
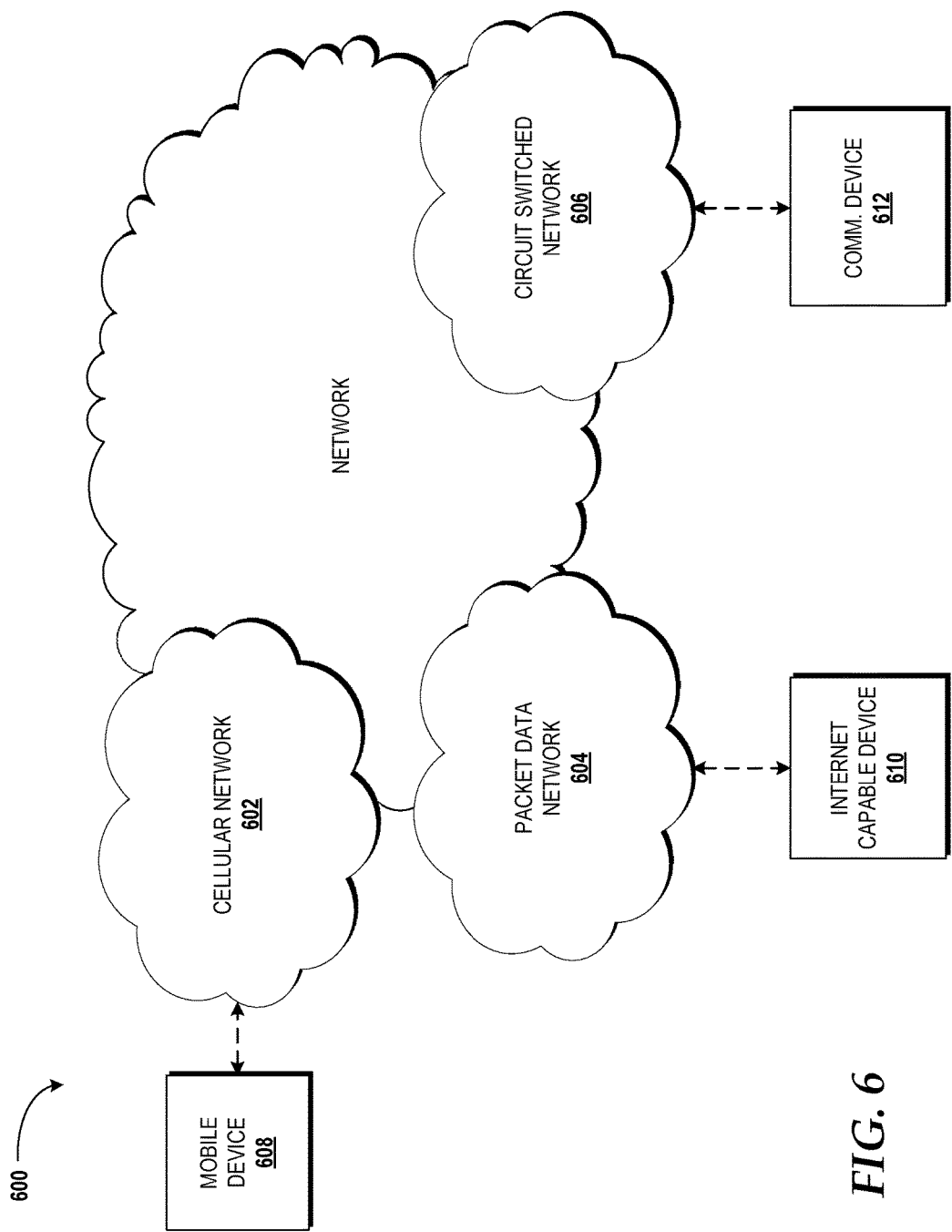
FIG. 6 is a block diagram schematically illustrating a network, according to an illustrative embodiment.

Turning now to FIG. 6, a schematic illustration of a network 600 will be described, according to an illustrative embodiment. The network 600 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards as well as evolved and future mobile standards.

The packet data network 604 includes various devices, for example, servers, computers, databases, and other devices in communication with another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system ("POTS"). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 600 is used to refer broadly to any combination of the networks 602, 604, 606. It should be appreciated that substantially all of the functionality described with reference to the network 600 can be performed by the cellular network 602, the packet data network 604, and/or the circuit switched network 606, alone or in combination with other networks, network elements, and the like. The network 600 can include the functionality of any of the networks described herein.

Figure 7:
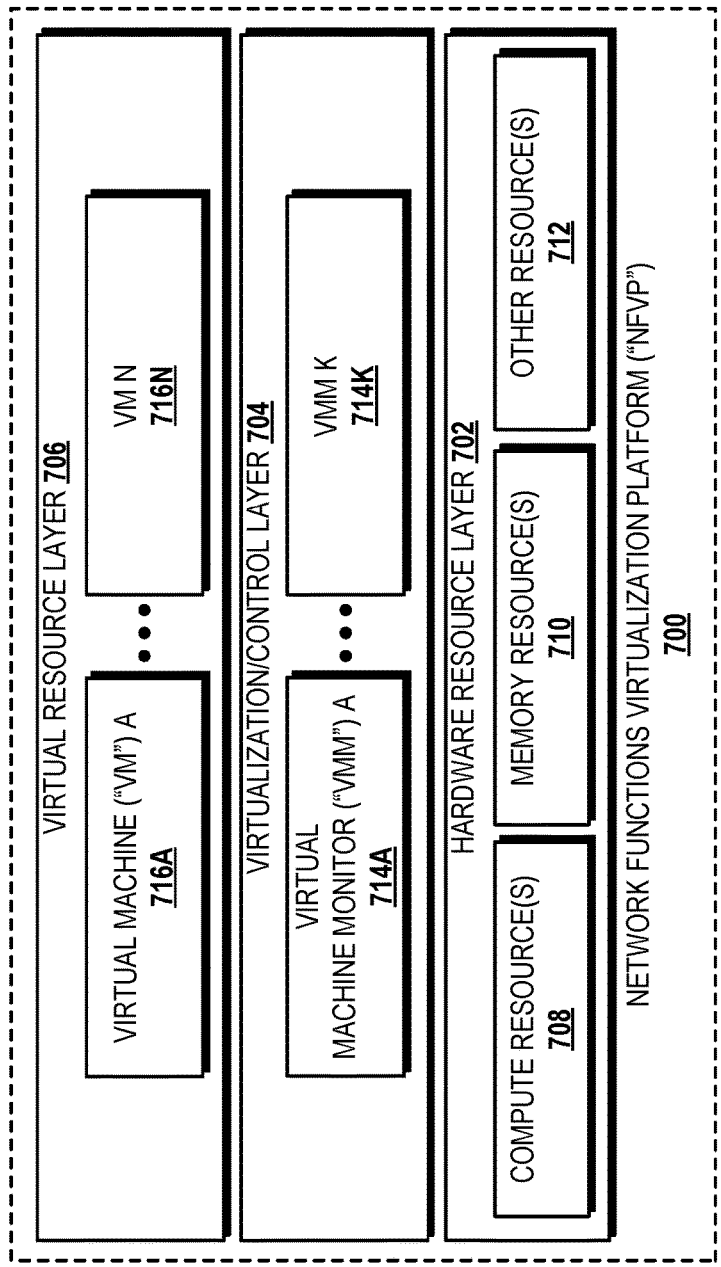
FIG. 7 is a block diagram illustrating an example network virtualization platform ("NVP") capable of implementing aspects of the embodiments presented herein.

Turning now to FIG. 7, a network functions virtualization platform ("NFVP") 700 will be described, according to an exemplary embodiment. The architecture of the NFVP 700 can be used to implement VNFs as virtual counterparts to physical network functions disclosed herein. The NFVP 700 can be utilized to implement, at least in part, components of the SDN network 114—the SDN controllers 116 and/or the SDN components 120. The NFVP 700 is a shared infrastructure that can support multiple services and network applications. The illustrated NFVP 700 includes a hardware resource layer 702, a virtualization/control layer 704, and a virtual resource layer 706 that work together to perform operations as will be described in detail herein.

The hardware resource layer 702 provides hardware resources, which, in the illustrated embodiment, include one or more compute resources 708, one or more memory resources 710, and one or more other resources 712. The compute resource(s) 708 can include one or more hardware components that perform computations to process data, and/or to execute computer-executable instructions of one or more application programs, operating systems, and/or other software. The compute resources 708 can include one or more central processing units ("CPUs") configured with one or more processing cores. The compute resources 708 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 708 can include one or more discrete GPUs. In some other embodiments, the compute resources 708 can include CPU and GPU components that are configured in accordance with a co-processing CPU/GPU computing model, wherein the sequential part of an application executes on the CPU and the computationally-intensive part is accelerated by the GPU. The compute resources 708 can include one or more system-on-chip ("SoC") components along with one or more other components, including, for example, one or more of the memory resources 710, and/or one or more of the other resources 712. In some embodiments, the compute resources 708 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 708 can be or can include one or more hardware components architected in accordance with an ARM architecture, available for license from ARM HOLDINGS of Cambridge, United Kingdom. Alternatively, the compute resources 708 can be or can include one or more hardware components architected in accordance with an x86 architecture, such an architecture available from INTEL CORPORATION of Mountain View, Calif., and others. Those skilled in the art will appreciate the implementation of the compute resources 708 can utilize various computation architectures, and as such, the compute resources 708 should not be construed as being limited to any particular computation architecture or combination of computation architectures, including those explicitly disclosed herein.

The memory resource(s) 710 can include one or more hardware components that perform storage operations, including temporary or permanent storage operations. In some embodiments, the memory resource(s) 710 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 708.

The other resource(s) 712 can include any other hardware resources that can be utilized by the compute resources(s) 708 and/or the memory resource(s) 710 to perform operations described herein. The other resource(s) 712 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resources layer 702 can be virtualized by one or more virtual machine monitors ("VMMs") 714A-714K (also known as "hypervisors"; hereinafter "VMMs 714") operating within the virtualization/control layer 704 to manage one or more virtual resources that reside in the virtual resource layer 706. The VMMs 714 can be or can include software, firmware, and/or hardware that alone or in combination with other software, firmware, and/or hardware, manages one or more virtual resources operating within the virtual resource layer 706.

The virtual resources operating within the virtual resource layer 706 can include abstractions of at least a portion of the compute resources 708, the memory resources 710, the other resources 712, or any combination thereof. These abstractions are referred to herein as virtual machines ("VMs"). In the illustrated embodiment, the virtual resource layer 706 includes VMs 716-716N (hereinafter "VMs 716"). Each of the VMs 716 can execute one or more software applications, such as, for example, software application including instructions to implement, at least in part, one or more components of the SDN network 114—for example, the SDN controllers 116 and/or the SDN components 120.

Based on the foregoing, it should be appreciated that concepts and technologies directed to an enhanced SDN controller to support ad-hoc RATs through a connectionless-based native Internet protocol by defining a plug-in interface have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A computer-readable storage medium having instructions for a software-defined networking controller stored thereon that, when executed by a processor, cause the processor to perform operations comprising:
    receiving, from an ad-hoc radio access controller serving an ad-hoc radio access network, an attach request sent on behalf of a user equipment operating in communication with an ad-hoc radio access technology transceiver node, wherein the attach request comprises a physical IP address associated with the user equipment, and wherein the physical IP address comprises an IP address sub-interface pre-fix, broadcast to the user equipment by the ad-hoc radio access technology transceiver node, combined with a physical address of the user equipment;

in response to the attach request, completing an attachment procedure for allowing the ad-hoc radio access controller access to a software-defined networking network;

informing the ad-hoc radio access controller of attachment success;

communicating with the ad-hoc radio access controller as if the ad-hoc radio access controller is a base station operating within a public carrier radio access network;

providing, to the ad-hoc radio access controller, an address of a preferred dynamic host configuration protocol server, wherein the ad-hoc radio access controller requests a public session layer IP address from the preferred dynamic host configuration protocol server;

receiving, from the ad-hoc radio access controller, an association between the public session layer IP address and the physical IP address; and updating a component operating within the software-defined networking network to reflect how to reach the user equipment via the public session layer IP address through the ad-hoc radio access controller with the IP address sub-interface pre-fix.

2. The computer-readable storage medium of claim 1, wherein the operations further comprise during a handover procedure whereby the user equipment moves from the ad-hoc radio access network to the public carrier radio access network, sending the public session layer IP address to the user equipment so that the user equipment can communicate with the public carrier radio access network without service interruption.

3. The computer-readable storage medium of claim 2, wherein the ad-hoc radio access network operates in accordance with an ad-hoc radio access technology selected from a group of ad-hoc radio access technologies comprising wireless local area network, low-power wide-area network, long-range wide-area network, and BLUETOOTH peer-to-peer.

4. The computer-readable storage medium of claim 1, wherein the user equipment comprises an Internet of things device.

5. A computer-readable storage medium having instructions for an ad-hoc radio access controller stored thereon that, when executed by a processor, cause the processor to perform operations comprising:

receiving an attach request from a user equipment operating in communication with an ad-hoc radio access technology transceiver node served by the ad-hoc radio access controller, wherein the attach request comprises a physical IP address associated with the user equipment, and wherein the physical IP address comprises an IP address sub-interface pre-fix broadcast to the user equipment by the ad-hoc radio access technology transceiver node combined with a physical address of the user equipment;

in response to the attach request, completing an attachment procedure for allowing the user equipment to access an ad-hoc radio access network comprising the ad-hoc radio access technology transceiver node;

assigning a local private IP address to the user equipment providing, on behalf of the user equipment, the attach request to a software-defined networking controller, wherein the software-defined networking controller completes attachment for allowing the user equipment access to a software-defined networking network via the ad-hoc radio access network;

receiving, from the software-defined networking controller, notification of attachment success;

receiving, from the software-defined networking controller, an address of a preferred dynamic host configuration protocol server;

requesting, from the software-defined networking controller, a public session layer IP address from the preferred dynamic host configuration protocol server;

receiving, from the preferred dynamic host configuration protocol server, the public session layer IP address; and informing the software-defined networking controller of an association between the public session layer IP address and the physical IP address, wherein the software-defined networking controller updates a component operating within the software-defined networking network to reflect how to reach the user equipment via the public session layer IP address through the ad-hoc radio access controller with the IP address sub-interface pre-fix.

6. The computer-readable storage medium of claim 5, wherein the operations further comprise setting up network address translation and port address translation between the local private IP address and the public session layer IP address.

7. The computer-readable storage medium of claim 5, wherein the ad-hoc radio access network operates in accordance with an ad-hoc radio access technology selected from a group of ad-hoc radio access technologies comprising wireless local area network, low-power wide-area network, long-range wide-area network, and BLUETOOTH peer-to-peer.

8. The computer-readable storage medium of claim 5, wherein the user equipment comprises an Internet of things device.

9. A software-defined networking controller comprising:
a processor; and
a memory that stores instructions of an inter-radio access technology mobility management function module that, when executed by the processor, cause the processor to perform operations comprising receiving, from an ad-hoc radio access controller serving an ad-hoc radio access network, an attach request sent on behalf of a user equipment operating in communication with an ad-hoc radio access technology transceiver node, wherein the attach request comprises a physical IP address associated with the user equipment, and wherein the physical IP address comprises an IP address sub-interface pre-fix broadcast to the user equipment by the ad-hoc radio access technology transceiver node combined with a physical address of the user equipment, in response to the attach request, completing an attachment procedure for allowing the ad-hoc radio access controller access to a software-defined networking network, informing the ad-hoc radio access controller of attachment success;

communicating with the ad-hoc radio access controller as if the ad-hoc radio access controller is a base station operating within a public carrier radio access network;

providing, to the ad-hoc radio access controller, an address of a preferred dynamic host configuration protocol server, wherein the ad-hoc radio access controller requests a public session layer IP address from the preferred dynamic host configuration protocol server;

receiving, from the ad-hoc radio access controller, an association between the public session layer IP address and the physical IP address; and updating a component operating within the software-defined networking network to reflect how to reach the user equipment via the public session layer IP address through the ad-hoc radio access controller with the IP address sub-interface pre-fix.

10. The software-defined networking controller of claim 9, wherein the operations further comprise during a handover procedure whereby the user equipment moves from the ad-hoc radio access network to the public carrier radio access network, sending the public session layer IP address to the user equipment so that the user equipment can communicate with the public carrier radio access network without service interruption.

11. The software-defined networking controller of claim 10, wherein the ad-hoc radio access network operates in accordance with an ad-hoc radio access technology selected from a group of ad-hoc radio access technologies comprising wireless local area network, low-power wide-area network, long-range wide-area network, and BLUETOOTH peer-to-peer.

12. The software-defined networking controller of claim 10, wherein the processor and the memory are resources of a network functions virtualization platform.

13. The software-defined networking controller of claim 9, wherein the user equipment comprises an Internet of things device.

* * * * *